United States Patent Office 3,808,198
Patented Apr. 30, 1974

3,808,198
LIVIDOMYCIN B DERIVATIVES
Takayuki Naito and Susumu Nakagawa, Tokyo, and Soichiro Toda, Kasukabe, Japan, assignors to Bristol-Myers Company, New York, N.Y.
No Drawing. Filed Sept. 7, 1972, Ser. No. 287,176
Int. Cl. C07c 129/18
U.S. Cl. 260—210 AB                6 Claims

ABSTRACT OF THE DISCLOSURE

Derivatives of lividomycin B have been prepared which possess substantially improved antibacterial activity. An example of such an agent is 1-[L-(−)-γ-amino-α-hydroxybutyryl]-lividomycin B [IV, BB–K82].

BACKGROUND OF THE INVENTION (1) Field of the invention.—This invention relates to a semisynthetic 1-substituted derivative of lividomycin B, said compound being prepared by acylating the 1-amino-function of lividomycin B with a γ-amino-α-hydroxybutyryl moiety.

(2) Description of the prior art.—(A) The lividomycins are reported and described in the Journal of Antibiotics (Japan) 24, No. 6, pp. 333–346 (1961). In particular lividomycin A and B are reported as fermented from Streptomyces lividus nov. sp., a culture deposited in the American Type Culture Collection at Rockville, Md., as A.T.C.C. No. 21178 and in the Fermentation Research Institute, Agency of Industrial Science & Technology, Chiba, Japan, as FERM–P No. 50.

(B) Lividomycin B has been prepared from Lividomycin A by T. Mori et al., J. Antibiotics, 25, 149 (1972).

SUMMARY OF THE INVENTION

The compound having the formula

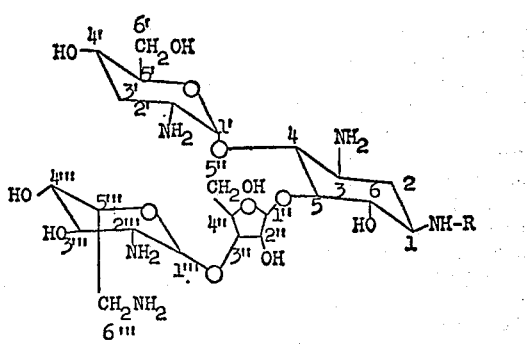

(IV)

in which R is L-(−)-γ-amino-α-hydroxybutyryl; or a nontoxic pharmaceutically acceptable acid addition salt thereof is a valuable antibacterial agent.

This invention relates to a semi-synthetic derivative of lividomycin B, said compound being known as 1-[L-(−)-γ-amino-α-hydroxybutyryl]-lividomycin B and having the formula

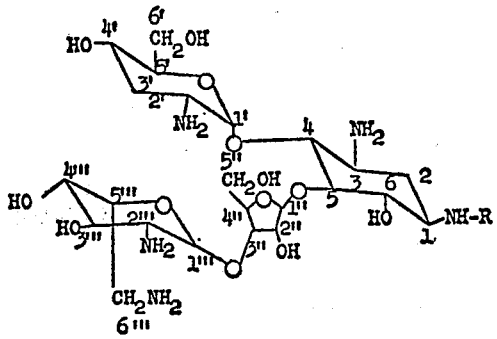

(IV)

in which R is L-(+)-γ-amino-α-hydroxybutyryl; or a nontoxic pharmaceutically acceptable acid addition salt thereof.

For the purpose of this disclosure, the term "nontoxic pharmaceutically acceptable acid addition salt" shall mean a mono, di, tri, tetra or penta salt formed by the interaction of one molecule of Compound IV with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

Lividomycin B is a compound having the formula

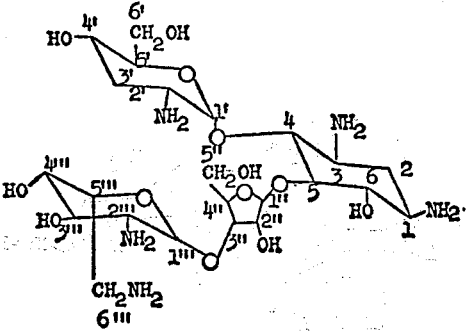

The compounds of the present invention are prepared by the following diagrammatic scheme:

(1) Lividomycin B   N-(benzoyl oxycarbonyloxy) Succinimide →

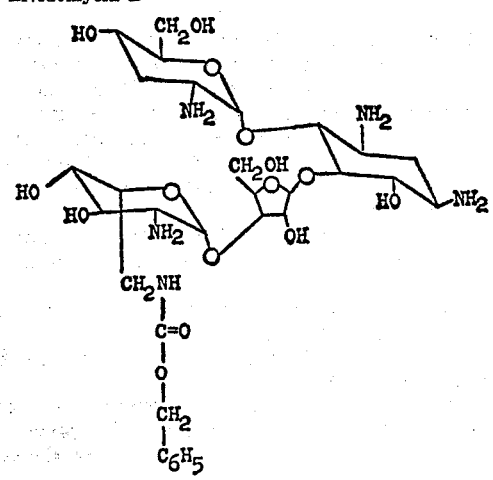

(II)

(2) Compound II

N - hydroxysuccinimide ester of L-(—)-γ-benzyloxycarbonylamino-α-hydroxybutyric acid
⟶

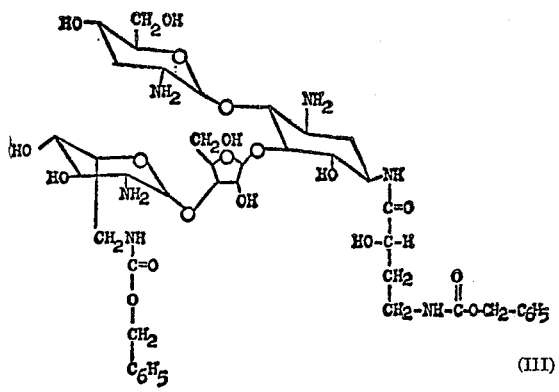

(III)

(3) Compound III  H₂/Pd/C ⟶

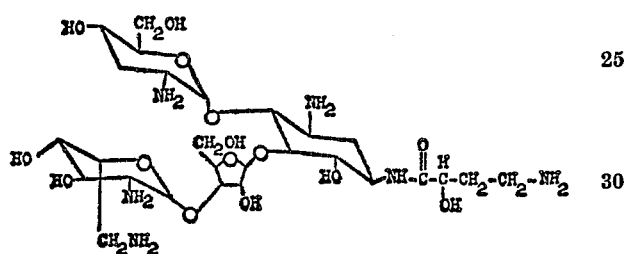

(IV)

A preferred embodiment of the present invention is the compound having the formula

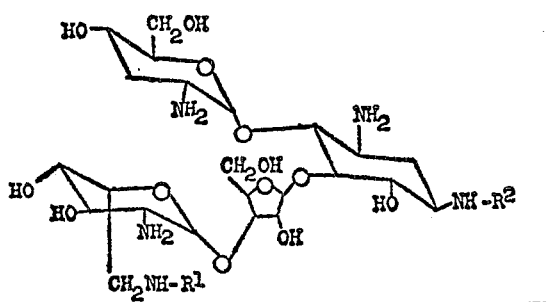

(V)

in which R¹ is H or

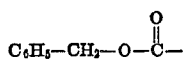

$C_6H_5-CH_2-O-\overset{O}{\underset{\|}{C}}-$ and R² is H or L-(—)-γ-amino-α-hydroxybutyryl or L-(—)-γ-benzyloxycarbonylamino - α - hydroxybutyryl wherein R¹ or R² must be other than H; or a nontoxic pharmaceutically acceptable acid addition salt thereof.

Another preferred embodiment is the compound of Formula V wherein R¹ is H and R² is L-(—)-γ-amino-α-hydroxybutyryl; or a nontoxic pharmaceutically acceptable acid addition salt thereof.

Other most preferred embodiments are the sulfate, hydrochloride, acetate, maleate, citrate, ascorbate, nitrate or phosphate salt of Compound V.

Another more preferred embodiment is the monosulfate salt of Compound IV.

Still another most preferred embodiment is the disulfate salt of Compound IV.

The objectives of the present invention have been achieved, by the provision according to the present invention of the process for the preparation of the compound having the formula

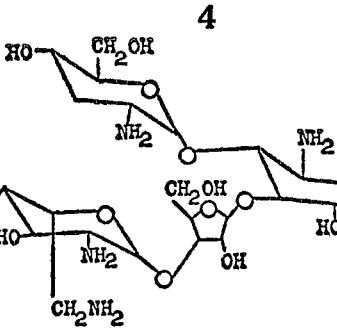

(IV)

in which R² is L-(—)-γ-amino-α-hydroxybutyryl; or a non-toxic pharmaceutically acceptable acid addition salt thereof; which process comprises the consecutive steps of (A) treating lividomycin B with an agent selected from the compounds having the formulas

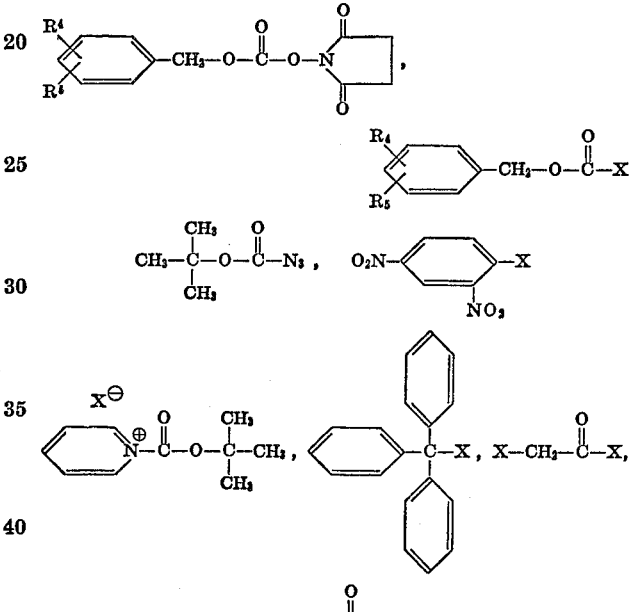

(or a carbodiimide addition compound thereof) or $$\underset{\text{(benzene ring)}}{\bigcirc}-\overset{O}{\underset{\|}{C}}-CH_2-CH_2-CO_2H$$

(or a carbodiimide addition compound thereof), in which R⁴ and R⁵ are alike or different and each is H, F, Cl, Br, NO₂, OH, (lower)alkyl or (lower)alkoxy, X is chloro, bromo or iodo, or a functional equivalent as a reactant; in a ratio of one mole or less of agent per mole of lividomycin B in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably 1:1 water-tetrahydrofuran, at a temperature below 50° C. and preferably below 25° C., to produce the compound having the formula

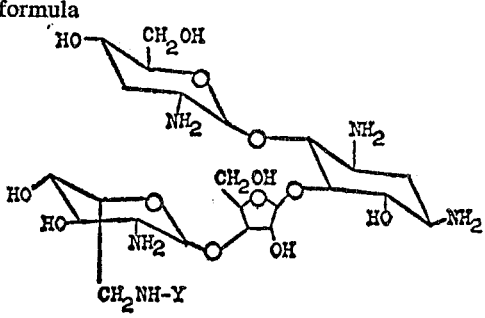

(II)

in which Y is a radical of the formula

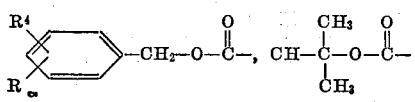

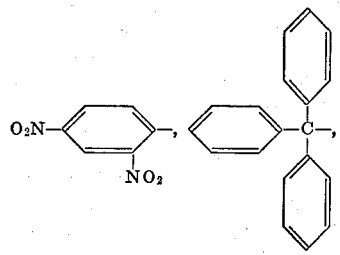

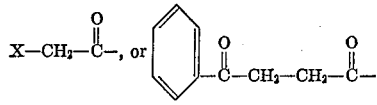

in which $R^4$ and $R^5$ are as defined above;

(B) acylating Compound II with an acylating agent having the formula

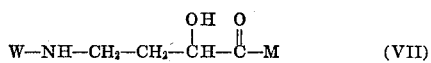   (VII)

in which W is a radical selected from the group comprising

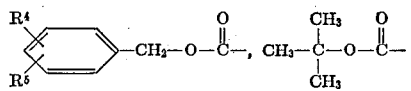

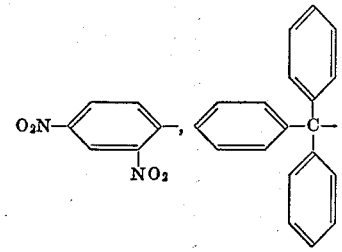

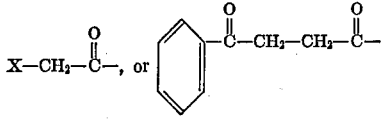

but preferably

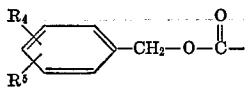

M is a radical selected from the group comprising

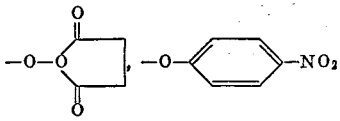

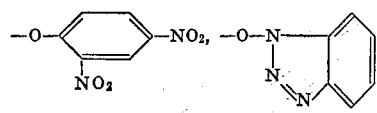

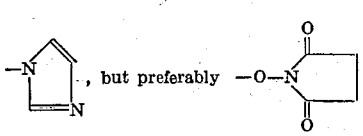

in which $R^4$ and $R^5$ are as above; in a ratio of at least 0.5 mole of Compound VII per mole of Compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-tetrahydrofuran, to produce the compound of the formula

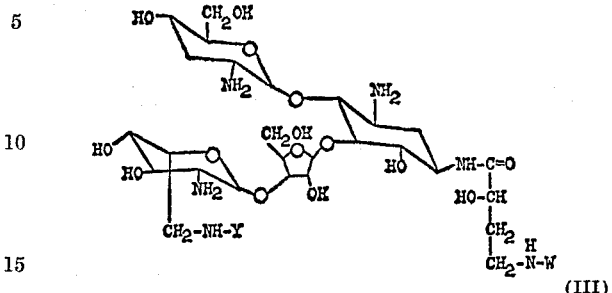

in which Y and W are as above; and (C) removing the blocking groups W and Y from compound III by methods commonly known in the art, and preferably when W and Y are radicals of the formula

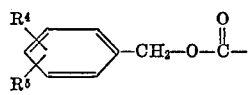

by hydrogenating Compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-dioxane.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with Compound II after first reacting said free acid with N,N' - dimethylchloroforminium chloride [cf. Great Britain 1,008,170 and Novak and Weichet, Experientia XXI/6, 360 (1965)] or by the use of enzymes or of an N,N'-carbonyldiimidazole or and N,N'-carbonylditriazole [cf. Sheehan and Hess, J. Amer. Chem. Soc. 77, (1955)] or of alkynylamine reagent [cf. R. Buijile and H. G. Viehe, Angew., Chem., International Edition 3, 582 (1964)], or of a ketenimine reagent [cf. C. L. Stevens and M. E. Monk, J. Amer. Chem. Soc., 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid which amide nitrogen is a member of a quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. These reactions are well-known in the art [cf. U.S. Pat. Nos. 3,079,314, 3,117,126 and 3,129,224 and British Pat. Nos. 932,644, 957,570 and 959,054).

Compound IV, 1 - [L-(—)-γ-amino-α-hydroxybutyryl]-lividomycin B, possesses excellent antibacterial activity. Illustrated below is a table showing the minimal inhibitory concentrations (MIC's) of lividomycin B, Compound IV (BB-K82) and other related mono and diacylated derivatives of lividomycin B against a variety of gram-positive and gram-negative bacteria as determined by the two-fold agar dilution method.

regenerated lividomycin B and α-hydroxy-γ-aminobutyric acid (HABA) by heating for one hour in 0.5 N sodium hydroxide solution. This fact, as well as the presence of an amido carbonyl band in IR spectra, show that all of them are lividomycin B derivatives acylated with L-HABA. Although the position of L-HABA residue on each of the products has not been established yet, BB-K80 to BB-K83 are assumed to be monoacyl derivatives of lividomycin B and BB-K84 to BB-K86 diacyl derivatives based on their behaviors in thin layer and column chromatographies.

BB-B82 is the most active component among the acylated products of lividomycin B and, in addition, exhibits a considerably increased activity compared with that of the parent antibiotic against the four kanamycin-desistant organisms as described above. On the basis of the data we have accumulated on BB-K82 and as compared to the properties of L-HABA derivatives of other aminoglyco-

IN VITRO ANTIMICROBIAL ACTIVITIES OF L-HABA DERIVATIVES OF LIVIDOMYCIN B

| MIC (mcg./ml.) | BB-K80 | BB-K81 | BB-K81 (lot 1-2) | BB-K83 | BB-K84 | BB-K85 | BB-K86 | Lividomycin B |
|---|---|---|---|---|---|---|---|---|
| Ec-1 E. coli NIHJ | 6.3 | >100 | 0.8 | 6.3 | >100 | 6.3 | >100 | 1.6 |
| Ec-3 E. coli Juhl A15119 | 12.5 | >100 | 0.8 | 6.3 | >100 | 12.5 | >100 | 31 |
| Ec-4 E. coli A15169 | 12.5 | >100 | 0.8 | 6.3 | >100 | 12.5 | >100 | 3.1 |
| Ec-5 E. coli KM-R¹ A20363 | 100 | >100 | 0.8 | 6.3 | >100 | 12.5 | >100 | >100 |
| Ec-6 E. coli A9844 | 3.1 | >100 | 0.4 | 6.3 | >100 | 6.3 | >100 | 1.6 |
| Ec-7 E. coli KM-R¹ A20365 | 25 | 50 | 0.2 | 1.6 | 100 | 1.6 | >100 | >100 |
| Ec-8 E. coli K-12 A9632 | 6.3 | >100 | 0.8 | 6.3 | >100 | 6.3 | >100 | 1.6 |
| Ec-9 E. coli K-12 KM-R¹ A20664 | 6.3 | >100 | 0.8 | 3.1 | 100 | 6.3 | >100 | 1.6 |
| Ec-10 E. coli K-12 KM-R¹ A20665 | 50 | 100 | 0.4 | 3.1 | 100 | 3.1 | >100 | >100 |
| Ec-52 E. coli W677 A20684 | 12.5 | >100 | 0.4 | 3.1 | >100 | 6.3 | >100 | 1.6 |
| Ec-53 E. coli JR/W677 A20683 | 6.3 | >100 | 0.8 | 6.3 | >100 | 6.3 | >100 | 3.1 |
| Kp-1 K. pneumoniae D-11 | 0.8 | 25 | 0.1 | 0.8 | 12.5 | 0.4 | 100 | 0.2 |
| Kp-8 K. pneumoniae Type 22 A20680 | 12.5 | >100 | 1.6 | 6.3 | >100 | 12.5 | >100 | 1.6 |
| Sm-1 Ser. Marcescens A20019 | 12.5 | >100 | 0.8 | 6.3 | 100 | 6.3 | >100 | 1.6 |
| Pa-1 Ps. aeruginosa D-15 | 100 | >100 | 6.3 | 50 | >100 | 50 | >100 | 25 |
| Pa-4 Ps. aeruginosa H9 D-113 KM-R¹ | 100 | >100 | 25 | 100 | >100 | >100 | >100 | 25 |
| Pa-2 Ps. aeruginosa A9923 | >100 | >100 | 25 | >100 | >100 | 100 | >100 | 25 |
| Pa-3 Ps. aeruginosa A9930 | 3.1 | 25 | 0.2 | 3.1 | 100 | 3.1 | >100 | 0.8 |
| Pa-5 Ps. aeruginosa A15150 | >100 | >100 | 25 | >100 | >100 | >100 | >100 | 50 |
| Pa-6 Ps. aeruginosa A15194 | 100 | >100 | 12.5 | >100 | >100 | >100 | >100 | 25 |
| Pa-15 Ps. aeruginosa GM-R² A20717 | >100 | >100 | 12.5 | >100 | >100 | >100 | >100 | 50 |
| Pa-16 Ps. aeruginosa GM-R² A20718 | >100 | >100 | 25 | >100 | >100 | >100 | >100 | 100 |
| Pa-17 Ps. aeruginosa H6 D-114 NM-R | 50 | >100 | 6.3 | 100 | >100 | 100 | >100 | 6.3 |
| Pv-1 Pr. vulgaris A9436 | 1.6 | 50 | 0.8 | 1.6 | 100 | 3.1 | >100 | 0.4 |
| Pv-2 Pr. vulgaris A9526 | 6.3 | 100 | 0.8 | 6.3 | >100 | 6.3 | >100 | 1.6 |
| Pm-1 Pr. mirabilis A9554 | 6.3 | >100 | 1.6 | 12.5 | >100 | 12.5 | >100 | 1.6 |
| Pm-2 Pr. mirabilis A9900 | 6.3 | >100 | 1.6 | 6.3 | >100 | 6.3 | >100 | 1.6 |
| Pg-1 Pr. mirganii A9553 | 3.1 | 100 | 0.8 | 3.1 | 100 | 3.1 | >100 | 0.8 |
| Pg-2 Pr. mirganii A20031 | 6.3 | >100 | 1.6 | 6.3 | >100 | 6.3 | >100 | 1.6 |
| Pr-1 Pr. rettgeri A15167 | | | | | | | | |
| Sa-2 S. aureus Smith A15167 | 1.6 | 12.5 | 0.1 | 1.6 | 25 | 1.6 | 100 | 0.2 |
| Sa-4 S. aureus 209P SM-R³ | 12.5 | >100 | 0.8 | 12.5 | >100 | 12.5 | >100 | 1.6 |
| Sa-10 S. aureus KM-R³ A20239 | 25 | 50 | 0.2 | 3.1 | 100 | 1.6 | >100 | 100 |
| Rs-1 B. subtilis PCI-219 | | | | | | | | |
| M6-1 Mycob. 607 | 1.6 | 6.3 | 0.2 | 1.6 | 12.5 | 0.4 | 12.5 | 0.4 |
| M6-2 Mycob. 607 KM-R¹ | 50 | >100 | 6.3 | 50 | 100 | 6.3 | 100 | 6.3 |
| M6-3 Mycob. 607 KM-R¹. SM-R³ | 25 | >100 | 6.3 | 12.5 | 100 | 3.1 | >100 | 3.1 |
| Mp-1 Mycob. phlei | 0.8 | 1.6 | 0.1 | 1.6 | 1.6 | 0.2 | 12.5 | 0.1 |
| Mr-1 Mycob. ranae | 3.1 | 6.3 | 0.2 | 3.1 | 12.5 | 0.4 | 25 | 0.4 |

¹ KM=Kanamycin resistant.
² GM=Gentamycin resistant.
³ SM=Streptomycin resistant.

BB-K82, the most active component, showed much better activity (125-500 times) than the parent antibiotic, lividomycin B, against four of kanamycin-resistant organism (E. coli A20363, E. coli A20365, E. coli A20665 and S. aureus A20239) which are known to inactivate kanamycin by 3'-phosphorylation (and also lividomycin probably by phosphorylation at a different position). BB-K82 also indicated the in vitro activity about equal to that of lividomycin B against other test organisms including two gentamicin-resistant strains (E. coli A20683 and K. pneumoniae A20680) which are known to inactivate gentamicin C by 2''-adenylation.

BB-K80, BB-K83 and BB-K85 showed an antibacterial spectrum similar to that of BB-K82 against the bacteria tested so far including the four lividomycin-resistant and BB-K82-sensitive strains, although the MIC values are 4-16 times inferior to those of BB-K82.

BB-K81, BB-K84 and BB-K86 were almost inactive against most of the test organisms.

It has been confirmed by thin layer chromatography (TLC) that all of the products, BB-K80 through BB-K86, side antibiotics prepared in our laboratories, it has been determined the acylation site of BB-K82 is the 1-amino group of the 2-deoxystreptamine moiety of lividomycin B, i.e.

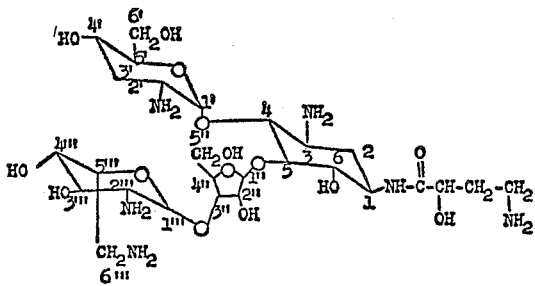

(IV)

Compound IV is valuable as an antibacterial agent, nutritional supplement in animal feeds, therapeutic agent in poultry and animals, including man, and is especially valuable in the treatment of infectious diseases caused by Gram-positive and Gram-negative bacteria.

Compound IV when administered orally is useful as an adjunctive treatment for preoperative sterilization of the bowel. Both aerobic and anaerobic flora which are susceptible to this drug are reduced in the large intestine. When accompanied by adequate mechanical cleansing, it is useful in preparing for colonic surgery.

Compound IV is effective in the treatment of ystemic bacterial infections when administered parenterally in the dosage range of about 250 mg. to about 3000 mg. per day in divided doses three or four times a day. Generally the compound is effective when administered at a dosage of about 5.0 to 7.5 mg./kg. of body weight every 12 hours.

Preparation of Lividomycin B

Lividomycin B was prepared from lividomycin A by a slightly modified procedure of the chemical conversion reported by T. Mori et al., J. Antibiotics, 25, 149 (1972), which comprised N-acetylation of lividomycin A followed by degradation of the mannose moiety with periodate and subsequent hydrolysis with barium hydroxide according to the scheme below:

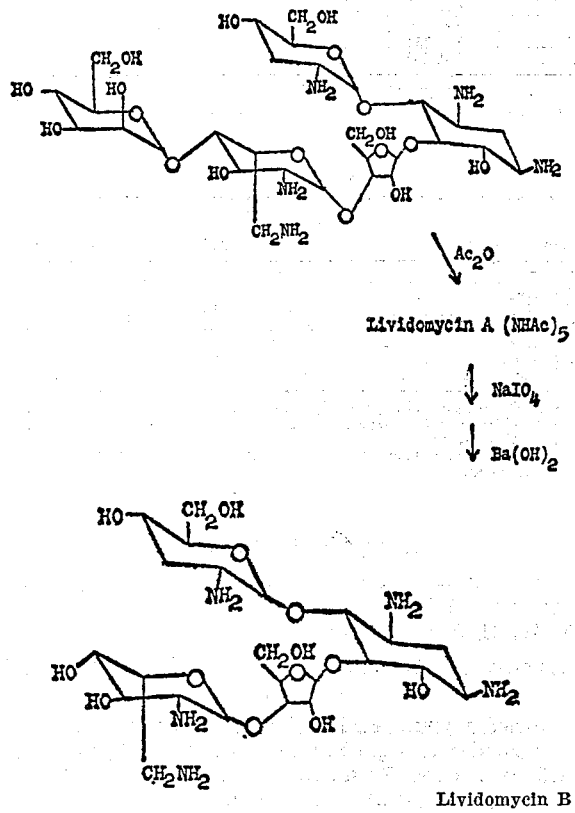

A suspension of 5.99 g. of lividomycin A in 300 ml. of methanol was stirred with 30 ml. of acetic anhydride overnight at room temperature. After confirming the negative ninhydrin test, the solution was evaporated into dryness. The oily residue was triturated with ether to give a white powder of penta-N-acetyl lividomycin A in an almost quantitative yield.

A solution of the penta-acetate in water (750 ml.) was treated with sodium periodate (4.24 g.) with stirring in the dark at room temperature for 18 hours. The reaction mixture was treated with ethylene glycol (2 ml.) for two hours at room temperature and freed from iodate by precipitation with lead diacetate (4.0 g.), the excess lead ions being removed with 5% sulfuric acid (2 ml.). The filtrate was heated with 10% AcOH (20 ml.) and phenylhydrazine (20 ml.) on a boiling water bath for three hours. After the reaction mixture was extracted with chloroform, the aqueous layer was passed through columns of Amberlite IR–120, ($H^+$, 110 ml.) and Amberlite IRA–410 ($OH^-$, 160 ml.). The eluate was concentrated to dryness to give yellow powder (6.57 g.). A mixture of the crude powder (6.5 g.) and barium hydroxide octahydrate (175 g.) was refluxed with stirring for five hours. The reaction mixture was cooled and filtered to remove insoluble material. To the filtrate was added ammonium carbonate (48 g.) and the mixture filtered to remove the resultant barium carbonate. The filtrate was concentrated to dryness to give 3.8 g. of crude lividomycin B. The crude material was purified by column chromatography with Amberlite CG–50 ($NH_4^+$, 65 ml.) to give 2.75 g. of pure lividomycin B (60% yield from penta-N-acetyl lividomycin A).

Amberlite CG 50 is the trade name for the chromatographic grade of a weakly acidic cationic exchange resin of a carboxylic-polymethacrylic type.

Amberlite IRA–410 is the tradename for a strongly basic anion exchange resin which is an amination produce between dimethylethanolamine and a chloromethylated styrene-divinylbenzene copolymer and its contains 3–5% of bound divinylbenzene. Mesh size 20–50. U.S. Pat. Nos. 2,614,099 and 2,591,573.

Amberlite IR–120 is the tradename for a high density nuclear sulfonic acid type cationic exchange resin supplied in either hydrogen or sodium form as beads—16–50 mesh.

EXAMPLES

Lividomycin B was acylated with 1 - (—)-γ-amino-α-hydroxybutyric acid using the scheme illustrated below to produce seven derivatives (four monoacylated and three diacylated) which were designated BB–K80 through BB–K86 in the order of elution in column chromatography with CG–50 ion exchanger. BB–K82, which exhibited the best antibacterial activity, is the desired 1-N-acyl derivative.

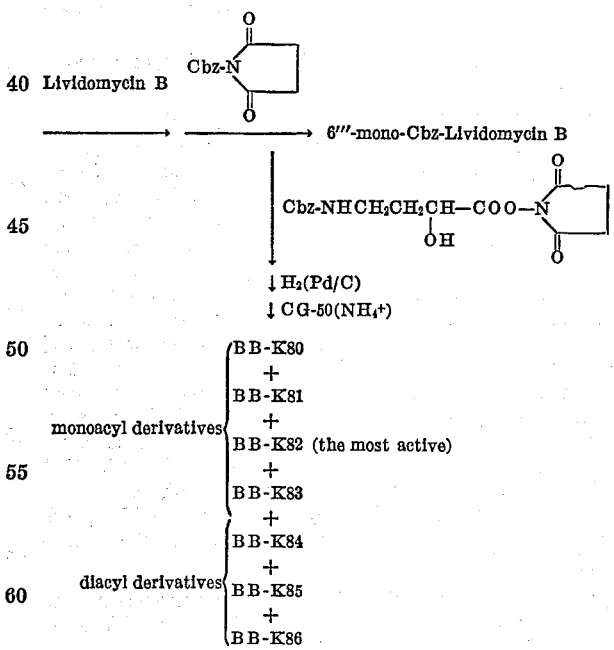

EXAMPLE 1

Preparation of L-(—)-γ-benzyloxycarbonylamino-α-hydroxybutyric acid (VI)

L - (—)-γ-amino-α-hydroxybutyric acid (7.4 g., 0.062 mole) was added to a solution of 5.2 g. (0.13 mole) of sodium hyroxide in 50 ml. of water. To the stirred solution was added dropwise at 0–5° C. over a period of 0.5 hour, 11.7 g. (0.068 mole) of carbobenzoxy chloride and the mixture was stirred for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5–79.5° C., $[\alpha]_D$ −4.5° (c.=2, $CH_3OH$). Infrared (IR) [KBr]: $\gamma_{C=O}$ 1740, 1690 cm.$^{-1}$. Nuclear magnetic resonance (NMR) (acetone-$d_6$) $\delta$ (in p.p.m. from TMS) 2.0 (2H, m), 3.29 (2H, d-d, J=6.7 and 12 Hz.), 4.16 1H, d-d, J=4.5 and 8 Hz), 4.99 (2H, s), 6.2 (2H, broad), 7.21 (5H, s).

Analysis.—Calc'd for $C_{12}H_{15}NO_5$ (percent): C, 56.91; H, 5.97; N, 5.33. Found (percent): C, 56.66; H, 5.97; N, 5.47.

EXAMPLE 2

N-hydroxysuccinimide ester of L-(−)-γ-benzyloxycarbonylamino-α-hydroxybutyric acid (VII)

A solution of 10.6 g. (0.042 mole) of VI and 4.8 g. (0.042 mole) of N-hydroxysuccinimide [1] in 200 ml. of ethyl acetate was cooled to 0° C. and then 8.6 g. (0.042 mole) of N,N'-dicyclohexylcarbodiimide was added. The mixture was kept overnight in a refrigerator. The dicyclohexylurea which separated was filtered off and the filtrate was concentrated to about 50 ml. under reduced pressure to give colorless crystals of VII which were collected by filtration; 6.4 g./M.P. 121–122.5° C. The filtrate was evaporated to dryness in vacuo and the crystalline residue was washed with 20 ml. of a benzene-n-hexane mixture to give an additional amount of VII. The total yield was 1.34 g. (92%). $[\alpha]_D$ 1.5° (c.=2, $CHCl_3$) IR (KBr) $\gamma_{C=O}$ 1810, 1755, 1740, 1680 cm.$^{-1}$. NMR (acetone-$d_6$) (in p.p.m. from TMS) 2.0 (2H, m), 2.83 (4H, s), 3.37 (2H, d-d, J=6.5 and 12.5 Hz.), 4.56 (1H, m), 4.99 (2H, s), 6.3 (2H, broad), 7.23 (5H, s).

Analysis.—Calc'd for $C_{16}H_{18}N_2O_7$ percent): C, 54.85; H, 5.18; N, 8.00. Found (percent): C, 54.79, 54.70; N, 5.21, 5.20; N, 8.14, 8.12.

Example 3.—Preparation of 6'''-benzyloxycarbonyl lividomycin B (II)

To a stirred solution of 2.75 g. (4.57 mmole) of lividomycin B free base in 65 ml. of 45% aqueous THF (tetrahydrofuran) was added 1.14 g. (4.57 mmole) of N-benzyloxycarbonyloxysuccinimide at 10° C. The reaction mixture was stirred for five hours at room temperature and evaporated under reduced pressure to remove the organic solvent. The resultant aqueous solution was washed with n-butanol and evaporated to dryness under reduced pressure to give 3.0 g. of crude solid. The crude material was dissolved in a small amount of water and charged on a column of CG-50 ($NH_4^+$, 100 ml.). The column was washed with 150 ml. of water and eluted with 0.1 $NH_4OH$. The eluate was collected in 20-ml. fraction. Fractions 13 to 29 were combined, evaporated under reduced pressure and lyophilized to give 1.023 g. (30.5%) of 6'''-benzyloxycarbonyl lividomycin B which did not contain dividomycin B itself. $\gamma_{C=O}$ 1700 cm.$^{-1}$. The product was used for the next reaction without further purification.

Example 4.—Preparation of 1-[L-(−)-γ-amino-α-hydroxybutyryl]-lividomycin B (IV, BB–K82) and BB–K80, 81, 83–86

To a stirred solution of 1.01 g. (1.38 mmole) of the 6'''-benzyloxycarbonyl lividomycin B (II) in 30 ml. of 50% aqueous THF was added 482 mg. (1.38 mmole) of N-hydroxysuccinimide ester of L-(−)-γ-benzyloxycarbonylamino-α-hydroxybutyric acid at 10° C. The reaction mixture was stirred for five hours at room temperature and then hydrogenated with 200 mg. of 10% palladium on charcoal at room temperature and atmospheric

[1] G. W. Anderson et al., J. Am. Chem. Soc., 86, 1839 (1964).

pressure. The reaction mixture was filtered and evaporated under reduced pressure to remove the organic solvent. The resultant aqueous solution was adsorbed on a column of CG-50 ($NH_4^+$, 70 ml.). The column was washed with 120 ml. of water and irrigated successively with 1.1 l. of 0.1 N ammonia, 1.5 l. of 0.2 N ammonia, 2.2 l. of 0.3 N ammonia, 1.4 l. of 0.5 N ammonia and finally 1.2 l. of 1.0 N ammonia. The eluate was collected in 20-ml. fraction. The fractions were grouped on the basis of ninhydrin test, bioassay (B. subtilis) and TLC (silica gel, $CHCl_3$—$CH_3OH$-28%

$$NH_4OH—H_2O=1:4:2:1,$$

ninhydrin). The fractions belonging to the same cut were combined, concentrated under reduced pressure and lyophilized.

| Cut | Fraction number | Eluted with— | Wt. isolated, mg. | Compound |
|---|---|---|---|---|
| 1 | 20–33 | 0.1N $NH_4OH$ | 82 | BB–K80. |
| 2 | 102–121 | 0.2 N $NH_4OH$ | 460 | Lividomycin B. |
| 3 | 172–191 | 0.3 N $NH_4OH$ | 77 | BB–K81. |
| 4 | 205–226 | 0.3 N $NH_4OH$ | 168 | BB–K82. |
| 5 | 261–268 | 0.5 N $NH_4OH$ | 99 | BB–K83. |
| 6 | 330–338 | 1.0 N $NH_4OH$ | 84 | BB–K84. |
| 7 | 340–350 | 1.0 N $NH_4OH$ | 57 | BB–K85. |
| 8 | 361–398 | 1.0 N $NH_4OH$ | 21 | BB–K86. |

*Rechromatography with CG–50 ($NH_4^+$, 7 ml.) gave 45 mg. of a pure product designated BB–K82, lot 1–2.

PROPERTIES

| Code number | M.P., °C. (dec.) | Rf [1] | $\gamma_{C=O}$ (KBr), cm.$^{-1}$ | $[\alpha]_D$ ($H_2O$) degrees |
|---|---|---|---|---|
| BB–K80 | 225–235 | 0.53 | 1,700, 1,640 | |
| BB–K81 | 183–189 | [2] 0.21 | 1,640 | +39 |
| BB–K82 | 183–187 | 0.16 | 1,640 | +47.5 |
| BB–K83 | 182–185 | [2] 0.21 | 1,640 | +51 |
| BB–K84 | 187–191 | 0.10 | 1,650 | +38 |
| BB–K85 | 190–194 | [3] 0.09 | 1,650 | +41 |
| BB–K86 | 184–189 | [3] 0.09 | 1,650 | |

[1] TLC: Silica gel plate, $CHCl_3$—MeOH-28% $NH_4OH$—$H_2O$ (1:4:2:1).
[2] BB–K83 is active against some lividomycin-resistant organisms, while BB–K81 is not.
[3] BB–K85 is active against some lividomycin-resistant organisms, while BB–K86 is not.

Microanalysis of BB–K82, lot 1–2

Analysis.—Calc'd for $C_{27}H_{52}NO_{15} \cdot 3H_2CO_3 \cdot 2H_2O$ (percent): C, 39.04; H, 6.77; N, 9.11. Found (percent): C, 39.16; H, 6.55; N, 9.12.

Example 5.—Preparation of N-(benzyloxycarbonyloxy) succinimide

N-hydroxysuccinimide (23 g., 0.2 mole) was dissolved in a solution of 9 g. (0.22 mole) of sodium hydroxide in 200 ml. of water. To the stirred solution was added dropwise 34 g. (0.2 mole) of carbobenzoxychloride with water-cooling and then the mixture was stirred at room temperature overnight to separate the carbobenzoxy derivative which was collected by filtration, washed with water and air dried. Yield 41.1 g. (82%). Recrystallization from benzene-n-hexane-(10:1) gave colorless prisms melting at 78–79° C.

Example 6.—Preparation of L-(−)-γ-amino-α-hydroxybutyric acid from ambutyrosin A or B or mixtures thereof Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6 N HCl and chromatographed on a column of CG-50 ($NH_4^+$ type). The desired L-(−)-γ-amino-α-hydroxybutyric acid was isolated by developing the column with water and removing the water by freeze drying. The L-(—)-γ-amino-α-hydroxybutyric acid is characterized as a crystalline material having a M.P. of 212.5–214.5° C. [column 2, lines 31–38, U.S. Pat. No. 3,541,078].

Example 7.—Preparation of L-(—)-γ-amino-α-hydroxybutyric acid from DL-α-hydroxy-γ-phthalimidobutyric acid (A) Dehydroabietylammonium L-α-hydroxy-γ-phthalimidobutyrate.—To a solution of 25 g. (0.1 mole) of α-hydroxy-γ-phthalimidobutyric acid [2] in 200 ml. of ethanol was added a solution of 29 g. (0.1 mole) of dehydroabietylamine in 130 ml. of ethanol. The solution was shaken vigorously for a minute and stood at room temperature for five hours during which time fine needles crystallized out. The crystals were collected by filtration, washed with 50 ml. of ethanol and air-dried to obtain 30.1 g. (56%) of a diastereomer of the dehydroabietylamine salt. M.P. 93–94° C. $[\alpha]_D^{24}$ +15° (c. 2.5, MeOH). Recrystallization from 300 ml. of ethanol gave 23.2 g. (43%) of the pure product. M.P. 94–95° C. $[\alpha]^{24}$ +10.8° (c. 2.5, MeOH). Further recrystallization did not change the melting point and the specific rotation.

Analysis.—Calc'd for $C_{32}H_{42}N_2O_5 \cdot H_2O$ (percent): C, 69.54; H, 8.02; N, 5.07. Found (percent): C, 69.58; H, 8.08, N, 5.07.

(B) L-(—)-γ-amino-α-hydroxybutyric acid.—To a solution of 1.5 g. (0.014 mole) of sodium carbonate in 40 ml. of water were added 5.3 g. (0.01 mole) of dehydroabietylammonium-L-α-hydroxy-γ-phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for ten hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR–120 (H+, 1 cm. x 35 cm.), the column was washed with 300 ml. of water and eluted with 1 N ammonium hydroxide solution. The eluate was collected in 15-ml. fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(—)-γ-amino-α-hydroxybutyric acid. M.P. 206–207° C. $[\alpha]_D^{24}$ —29° (C. 2.5, H₂O). The IR spectrum was identical with an authentic sample which was obtained from ambutyrosin.

Example 8.—Preparation of monosulfate salt of 1-[L-(—)-γ-amino-α-hydroxybutyryl]-lividomycin B One mole of 1-[L-(—)-γ-amino-α-hydroxybutyryl)-lividomycin B is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture until precipitation occurs. The solids are collected by filtration and are determined to be the desired monosulfate salt.

[2] Y. Saito et al., Tetrahedron Letters, 1970, 4863.

Example 9.—Preparation of the disulfate salt of 1-[L-(—)-γ-amino-α-hydroxybutyryl]-lividomycin B One mole of 1-[L-(—)-γ-amino-α-hydroxybutyryl]-lividomycin B is dissolved in 1 to 3 liters of water. The solution is filtered to remove any undissolved solids. To the chilled and stirred solution is added two moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

We claim:
1. A compound having the formula

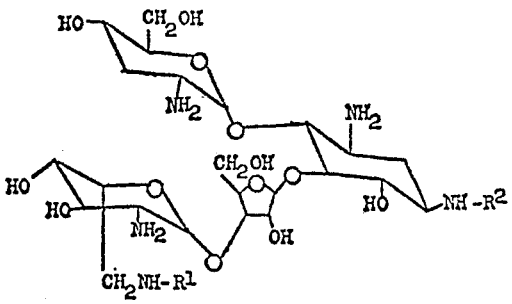

in which $R^1$ is H or

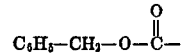

and $R^2$ is H, L-(—)-γ-amino-α-hydroxybutyryl or L-(—)-γ-benzyloxycarbonylamino-α-hydroxybutyryl, wherein $R^1$ or $R^2$ must be other than H; or a nontoxic pharmaceutically acceptable acid addition salt thereof.

2. The compound of claim 1 wherein $R^1$ is

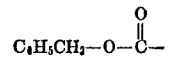

and $R^2$ is H.

3. The compound of claim 1 wherein $R^1$ is

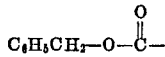

and $R^2$ is L-(—)-γ-benzyloxycarbonylamino-α-hydroxybutyryl.

4. The compound of claim 1 wherein $R^1$ is H and $R^2$ is L-(—)-γ-amino-α-hydroxybutyryl; or a nontoxic pharmaceutically acceptable acid addition salt thereof.

5. The monosulfate salt of the compound of claim 4.
6. The disulfate salt of the compound of claim 4.

References Cited
UNITED STATES PATENTS

| | | | |
|---|---|---|---|
| 2,916,485 | 12/1959 | Frohardt et al. | 260—210 AB |
| 3,277,078 | 10/1966 | Horii et al. | 260—210 AB |
| 3,661,892 | 5/1972 | Shomura et al. | 260—210 AB |
| 3,669,838 | 6/1972 | Shier et al. | 260—210 AB |

JOHNNIE R. BROWN, Primary Examiner

U.S. Cl. X.R.
195—80; 424—181